United States Patent [19]

Ohta et al.

[11] 4,322,856
[45] Mar. 30, 1982

[54] DOUBLE SUPERHETERODYNE TUNER FOR RECEIVING TELEVISION AURAL SIGNALS

[75] Inventors: Shigeo Ohta, Saoma; Takeo Suzuki, Soma; Kazumi Kuwabara, Fukushima, all of Japan

[73] Assignee: Alps Electric Co., Ltd., Tokyo, Japan

[21] Appl. No.: 130,192

[22] Filed: Mar. 13, 1980

[30] Foreign Application Priority Data

Mar. 14, 1979 [JP] Japan .................. 54-29568

[51] Int. Cl.$^3$ .................................... H04B 1/26
[52] U.S. Cl. .................... 455/189; 455/190; 455/315
[58] Field of Search .......... 455/142, 189, 190, 207, 455/209, 314, 315, 319, 320

[56] References Cited

U.S. PATENT DOCUMENTS

| | | | |
|---|---|---|---|
| 2,510,906 | 6/1950 | Reid | 455/316 |
| 2,529,443 | 11/1950 | Bach | 455/315 |
| 2,589,387 | 3/1952 | Hugenholtz | 455/316 |
| 2,616,037 | 10/1952 | Wheeler et al. | 455/319 |
| 2,849,602 | 8/1958 | Hesse | 455/319 |
| 3,343,092 | 9/1967 | Davids et al. | 455/316 |
| 3,479,601 | 11/1969 | Mattern | 455/319 |
| 3,696,302 | 10/1972 | Gossard | 455/189 |

FOREIGN PATENT DOCUMENTS 2746931  4/1978  Fed. Rep. of Germany ...... 455/189

Primary Examiner—Marc E. Bookbinder
Attorney, Agent, or Firm—Guy W. Shoup; Gerard F. Dunne

[57] ABSTRACT

A double superheterodyne tuner for receiving television aural signals comprises first local oscillators by which an output of a first mixer receiving a VHF signal or a UHF signal is made a frequency between the VHF signal and the UHF signal, and a second local oscillator by which an output of a second mixer receiving a first intermediate frequency signal is made a frequency of 10.7 MHz. Oscillator frequencies are selected to avoid beat frequency interference for harmonics thereof up to and including the fifth order.

9 Claims, 5 Drawing Figures

DOUBLE SUPERHETERODYNE TUNER FOR RECEIVING TELEVISION AURAL SIGNALS

BACKGROUND OF THE INVENTION

The present invention relates to a tuner for receiving television aural signals, and more particularly to an all-channel tuner which can receive both a UHF signal and a VHF signal.

A tuner for receiving television aural signals often comprises a VHF tuner and a UHF tuner which are typically independent of each other. Such a tuner is constructed so that an input signal is first converted into an aural intermediate frequency signal (hereinafter, termed "aural IF signal") of 54.25 MHz (Japanese standard) in each of the tuners, whereupon the aural IF signal is converted into 10.7 MHz in a mixer disposed at a stage succeeding the tuners. In such tuner apparatus, except the mixer at the succeeding stage, tuning portions independent of each other are necessary for the VHF signal and the UHF signal. Therefore, the circuit arrangement is wasteful, and the complicated circuitry hinders miniaturization and reduction of cost.

SUMMARY OF THE INVENTION

It is therefore an object of the present invention to provide a tuner for receiving television aural signals in which circuits are used for both a VHF tuner portion and a UHF tuner portion to the utmost.

Another object of the present invention is to provide a double-superheterodyne type television aural signal-receiving tuner which can be miniaturized quite easily.

Still another object of the present invention is to provide a television aural signal-receiving tuner which can effectively carry out automatic frequency control.

To these ends, according to the present invention, a tuner for reception is made of the double-superheterodyne type, and a VHF signal and a UHF signal are processed by common circuits as far as possible. The frequency of a first IF signal is set at a frequency between the VHF signal and the UHF signal and is made not to interfere with the second IF signal.

Further objects and advantages of the present invention will become apparent from the following description taken in conjunction with the drawings.

PREFERRED EMBODIMENTS OF THE INVENTION

Figure 1:
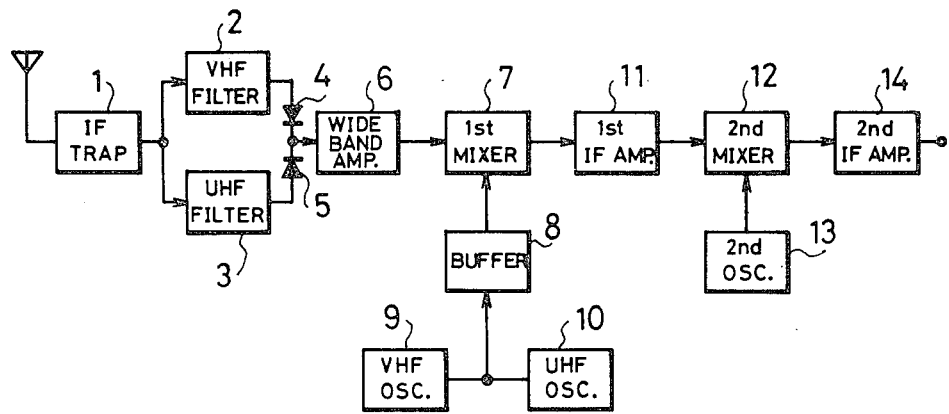
FIG. 1 is a block diagram of an embodiment of the present invention.

Referring to FIG. 1, a first IF signal to be described later is removed by an IF trap 1. A VHF signal passes through a VHF filter 2, and a UHF signal passes through a UHF signal 3. The change-over between the VHF and UHF bands is executed by means of switching diodes 4 and 5. Either the VHF signal or the UHF signal selected by the switching diodes 4 and 5 has signals within a band which can be amplified collectively by a wide-band amplifier 6, and is thereafter applied to a first mixer 7 employing a balance type mixer. The reason for the employment of the mixer of the balance type is that signals of wide band are processed, so a mixer of good rectilinearity is required.

A signal from a VHF oscillator 9 or a UHF oscillator 10, serving as a first local oscillator, is injected into the first mixer 7 via a buffer amplifier 8. The VHF oscillator 9 is a tuned type variable oscillator which employs a varactor diode (hereinafter, simply called "varactor") and which effects selection between a low band and a high band of the VHF. The UHF oscillator 10 is also a tuned type variable oscillator which employs a varactor. The selection between the oscillators 9 and 10 is performed simultaneously with the selection between the switching diodes 4 and 5. The buffer amplifier 8 is used for increasing the power of the local oscillation signal because the injection energy is insufficient with the oscillator only.

Another feature of the present invention is that the first IF signal is set at approximately 430 MHz, which is between the VHF signal and the UHF signal in, for example, the Japanese system. Consequently, the local oscillation frequency of a VHF oscillator 9 used in Japan would be from 430 MHz +95.75 MHz=525.75 MHz to 430 MHz+221.75 MHz=651.75 MHz. The local oscillation frequency of the UHF oscillator 10 used in Japan would thus be from 430 MHz+475.75 MHz=905.75 MHz to 430 MHz+769.75 MHz=1,199.75 MHz.

A first IF amplifier 11 passes and amplifies only the IF signal of 430 MHz, and transmits the amplified signal to a second mixer 12. The second mixer 12 executes a frequency conversion on the basis of the first IF signal of 430 MHz and an oscillation signal at an oscillation frequency of 440.7 MHz from a third oscillator 13 serving as a second local oscillator, and prepares a second IF signal of 10.7 MHz. Only this signal of 10.7 MHz is provided as an output owing to the tuning of a second IF amplifier 14 at the next stage.

The reason why the first IF signal has been made approximately 430 MHz will now be described. Letting $f_{1st\ OSC}$ denote the oscillation frequency of the first local oscillator 9 or 10, $f_{2nd\ OSC}$ denote the oscillation frequency of the second local oscillator, $f_{1st\ IF}$ denote the frequency of the first IF signal, and $f_{RF}$ denote the input signal, the following relations hold:

$$f_{1st\ OSC} = f_{RF} + f_{1st\ IF} \tag{1}$$

$$f_{2nd\ OSC} = f_{1st\ IF} + 10.7\ \text{MHz} \tag{2}$$

Therefore, the frequencies $f_{1st\ OSC}$ and $f_{2nd\ OSC}$ need to be designed so as not to interfere with each other. The beat frequency $f_{beat}$ between both the oscillation frequencies is evaluated from the following expression, and is prevented from becoming 10.7 MHz:

$$f_{beat} = m \cdot f_{1st\ OSC} \pm n \cdot f_{2nd\ OSC} \tag{3}$$

m and n were studied in detail as integral values of from 1 to 5, respectively, with the result that 430±7 MHz has turned out to be appropriate for the first IF signal. The maximum values of m and n have been made 5 because the higher harmonics of elements to be used are extremely small after the fifth order.

A further feature of the present invention consists in an automatic frequency control circuit (hereinbelow, abbreviated to "AFC circuit"). As stated previously, the oscillation frequency of the VHF oscillator 9 and that of the UHF oscillator 10 are respectively 525.75–651.75 MHz and 905.75–1,199.75 MHz, which are very high frequencies. Therefore, it brings about the following problems to apply the automatic frequency controls to the respective local oscillation portions.

Since the frequency is high, a very difficult design is required for assembling an AFC circuit. It is also difficult to apply a precise AFC of delicate control. Further, it is disadvantageous in cost to equip the two blocks with respective AFC circuits.

It has accordingly been decided to exert the AFC on the second local oscillator 13. The reasons are that the oscillation frequency is fixed and is a proper frequency of approximately 440 MHz, and that uniform controls become possible over all the channels.

Even when some frequency drift has occurred in the VHF oscillator 9 or the UHF oscillator 10, no problem will be incurred since the pass band of the first IF amplifier is made somewhat wider in advance. Owing to the narrow bandwidth of the television aural signals and to the FM modulation, amplitude limitation attributed to the deviation of the first IF resonance band forms no hindrance to practical use.

Figure 2:
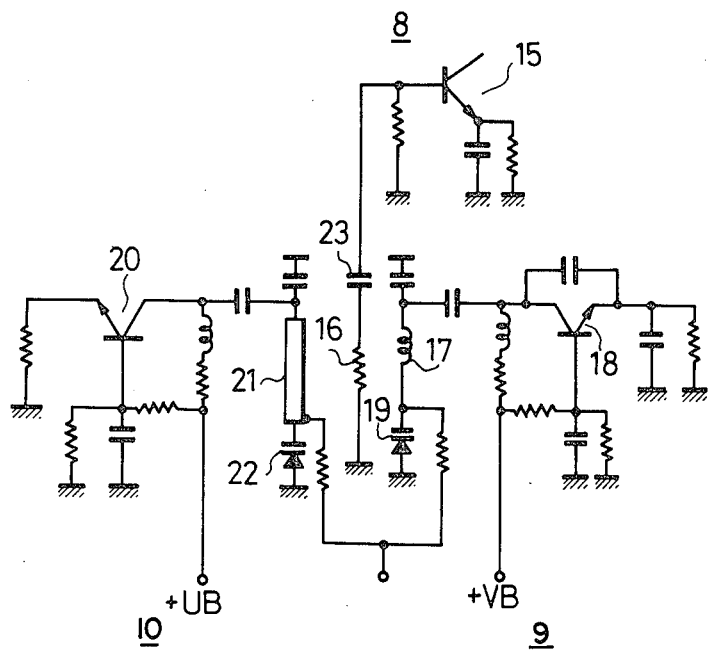
FIG. 2 is a circuit diagram showing a VHF local oscillator as well as a UHF local oscillator and a pickup loop for picking up the oscillation energies of both the oscillators, in an embodiment of the present invention.

A still further feature of the present invention consists in a coupling circuit between the buffer amplifier 8 and the VHF oscillator 9 as well as the UHF oscillator 10. A concrete circuit arrangement of the coupling circuit is shown in FIG. 2.

Principal constituent circuits will now be explained. In FIG. 2, numeral 15 designates a buffer amplifier transistor, which constitutes the circuit of the buffer amplifier 8. A VHF oscillating coil 17, a VHF oscillating transistor 18 and a VHF oscillating varactor 19 are the major circuit elements of the VHF oscillator 9. When a tuning voltage is applied to the varactor 19, tuning of the VHF channel is performed. The UHF oscillator 10 includes a UHF oscillating varactor 22, a UHF oscillating coil 21 and a UHF oscillating transistor 20. The change-over between the UHF oscillator 10 and the VHF oscillator 9 is executed by applying a B voltage to a terminal +VB in case of the VHF reception and to a terminal +UB in case of the UHF reception.

The energy of each oscillator is picked up by means of a series circuit consisting of a resistor 16 and a capacitor 23, and is coupled to the base of the transistor 15 of the buffer amplifier 8.

Figure 3:
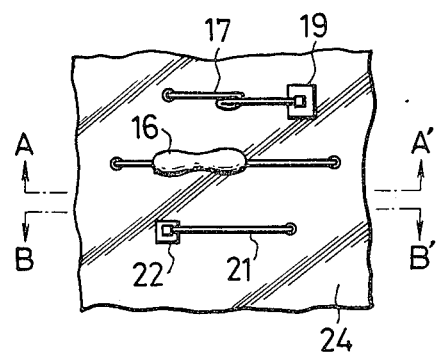
FIG. 3 is a top view showing the arrangement on a circuit board, of the pickup loop and respective oscillation coils of the VHF local oscillator and the UHF local oscillator.
Figure 4:
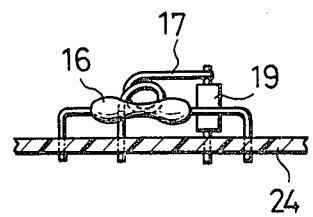
FIG. 4 is a sectional view taken along A—A' in FIG. 3.
Figure 5:
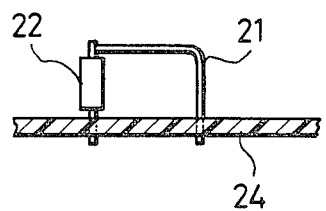
FIG. 5 is a sectional view taken along B—B' in FIG. 3.

An example of the arrangement among the pickup circuit and the oscillating coils is illustrated in FIGS. 3 to 5. The resistor 16 is arranged between the respective oscillating coils 17 and 21. The two coils 17 and 21 and the resistor 16 are fixedly arranged on a printed circuit board 24.

In general, pickup of the local oscillation level of a UHF oscillator has typically been carried out with M coupling, and the pickup from a VHF oscillator has been carried out with C coupling.

In the present invention, since the first IF signal is set at approximately 430 MHz, the oscillation frequencies become approximately 520–650 MHz in the VHF oscillator 9 and approximately 900–1,200 MHz in the UHF oscillator 10 in a tuner designed for use in Japan, so that the frequency ratio of the oscillation frequencies is about 2 (two) and that both the oscillation frequencies are within the UHF band. Therefore, the pickups from both the VHF oscillator and UHF oscillator may be performed by M coupling. In addition, the use of the resistor 16 for the pickup tends to lessen the deviation of the detection level ascribable to a frequency change and also to prevent the abnormal oscillation of the buffer amplifier 8.

More specifically, when the resistor is employed for the pickup, the resistance exhibits no frequency-dependency, and the impedance of the pickup loop becomes substantially equal for all frequencies. Therefore, substantially equal loads are established for the oscillators so as to render the pickup levels substantially uniform, and substantially equal input impedances are established for the buffer amplifier 8. In consequence, a stable amplifying operation becomes possible.

Conversely, let it be supposed that a loop which is not resistive is used for the pickup. The capacitor 23 included in series in the pickup loop cuts off direct current. At the same time, however, an unnecessary resonance is liable to occur within the pickup loop in series, an abnormal level detection taking place at that frequency. The use of the resistor can also prevent such drawback.

The existence of a resistive pickup circuit between both the oscillators 9 and 10 permits the pickups from the respective oscillators at equal levels and with a single circuit. Moreover, since both the oscillators 9 and 10 can be isolated by the pickup circuit arranged therebetween, the oscillator which is inoperative can be prevented from becoming a load to the operating oscillator, and hence, stable operations of both the oscillators become possible. By way of example, a favorable result was obtained when a resistor of 75Ω was used as the resistor 16.

As set forth above, according to the present invention, a tuner for television aural signals can be constructed of simple circuits as the VHF and UHF portions are conjointly used to the utmost, so that an inexpensive and small-sized tuner can be provided. Since the AFC is applied to the fixed oscillator whose frequency is lower than the frequencies of the other oscillators, the AFC operation becomes stable and reliable, and since the frequency of the first IF signal is made approximate 430 MHz, any beat interference does not occur. Further, since a resistor is employed for pickup of the signals from the first local oscillators, the impedance of the pickup circuit becomes substantially uniform, and the loads of the oscillators, the pickup levels and the input impedances of the buffer amplifier become substantially equal. Still further, any unnecessary resonance is not formed in the pickup circuit, and a stable reception is ensured. The present invention achieves such great effects.

What is claimed is:

1. In a double superheterodyne tuner for receiving television signals in both the VHF band and the UHF band, said tuner including a first local VHF oscillator adapted to produce an appropriate local oscillation signal during reception of signals in the VHF band, a second local UHF oscillator adapted to produce an appropriate local oscillation signal during reception of signals in the UHF band, means associated with said local oscillators for selecting the local oscillation signal corresponding to the band of the received signal, a first mixer stage for producing a first intermediate frequency upon combining with the received signal a first local oscillation signal selected from said first local VHF oscillator or said second local UHF oscillator, and a second mixer stage producing a second intermediate frequency upon combining a second local oscillation signal from a third local oscillator with the first intermediate frequency, the improvement comprising the frequency range of said first local VHF oscillator and said second local UHF oscillator being selected to assure that the beat frequency between said first intermediate frequency and said second local oscillation signal will not be equal to and thereby not interfere with said second local oscillation signal for the harmonics of said two local oscillation signals up to and including the fifth order.

2. A tuner according to claim 1, said first intermediate frequency having a value between the VHF band and the UHF band.

3. A tuner according to claim 2, said value being approximately 430 MHz.

4. A tuner according to claim 1, said second intermediate frequency having a value of approximately 10.7 MHz.

5. A tuner according to claim 1, said VHF oscillator and said UHF oscillator both being variable.

6. A tuner according to claim 1, including a pickup circuit for receiving the energy from both said VHF oscillator and said UHF oscillator, said pickup circuit including a resistor of relatively low resistance arranged between the respective oscillators.

7. A tuner according to claim 6, said resistor having a d.c. resistance value of approximately 75 $\Omega$.

8. A tuner according to claim 1, said first local oscillation signal being produced by a variable oscillator, and said second local oscillation signal being produced by a fixed oscillator.

9. A tuner according to claim 8, further including an automatic frequency control circuit operable with said fixed oscillator.

* * * * *